United States Patent [19]

Fenster et al.

[11] Patent Number: 4,685,146

[45] Date of Patent: Aug. 4, 1987

[54] AUTOMATIC MISREGISTRATION CORRECTION

[75] Inventors: Paul Fenster, Petach Tikva; Yair Shimoni, Jerusalem, both of Israel

[73] Assignee: Elscint Ltd., Haifa, Israel

[21] Appl. No.: 614,840

[22] Filed: May 29, 1984

[30] Foreign Application Priority Data

Jul. 26, 1983 [IL] Israel ........................ 69327

[51] Int. Cl.⁴ ............................................. G06K 9/40
[52] U.S. Cl. .................................... 382/54; 364/414; 382/6; 382/41; 382/44
[58] Field of Search ................... 382/6, 30, 54, 41, 44; 364/414; 378/4, 21, 62, 901

[56] References Cited

U.S. PATENT DOCUMENTS

| | | | |
|---|---|---|---|
| 3,905,045 | 9/1975 | Nickel | 382/6 |
| 4,217,641 | 8/1980 | Naparstek | 382/54 |
| 4,333,145 | 6/1982 | Heuscher et al. | 382/6 |
| 4,335,427 | 6/1982 | Hunt et al. | 382/6 |
| 4,395,699 | 7/1983 | Sternberg | 382/41 |
| 4,430,749 | 2/1984 | Schardt | 382/6 |
| 4,437,161 | 3/1984 | Anderson | 382/6 |
| 4,463,375 | 7/1984 | Macovski | 364/414 |
| 4,538,227 | 8/1985 | Torqichi et al. | 378/62 |
| 4,550,371 | 10/1985 | Glover et al. | 382/54 |
| 4,551,800 | 11/1985 | Riederer et al. | 364/414 |
| 4,590,607 | 5/1986 | Kauth | 382/44 |

Primary Examiner—Leo H. Boudreau
Assistant Examiner—Joseph Mancuso
Attorney, Agent, or Firm—Sandler & Greenblum

[57] ABSTRACT

A method and system for determining the movement of an object between different images of the same object; where the movement is defined by a vector value and the vector value is used to correct for misregistration between the different images.

34 Claims, 1 Drawing Figure

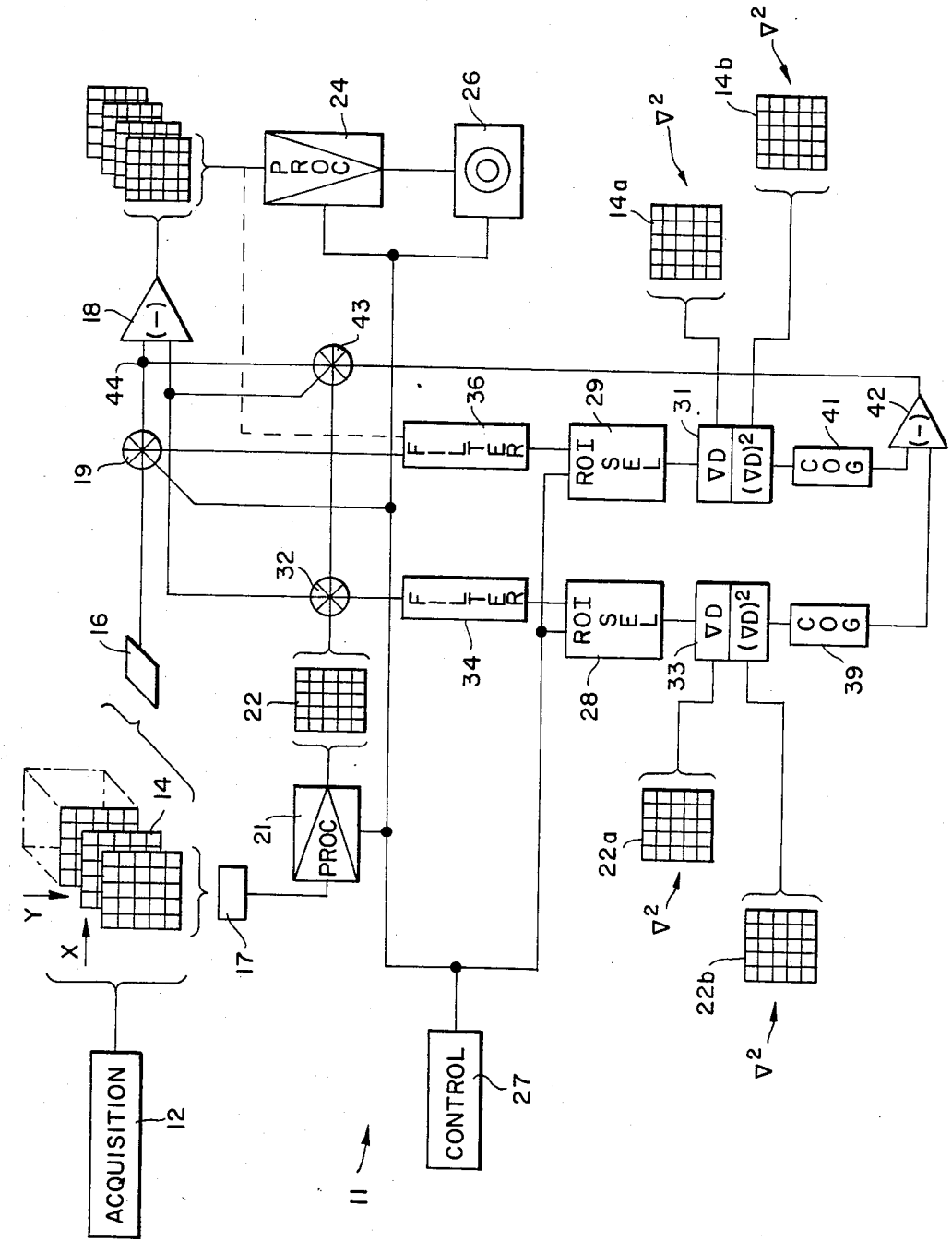

AUTOMATIC MISREGISTRATION CORRECTION

FIELD OF THE INVENTION

This invention is concerned with image enhancement through comparison and/or automatic image registration techniques and equipment for assuring valid registration of the images to be compared and/or to enable obtaining image enhancement with minimal artifacts.

BACKGROUND OF THE INVENTION

Many image enhancement processes use image comparisons, wherein two or more images of the same object are compared. Examples of comparison techniques are subtraction, merger, and addition. The image subtraction process is especially used where changing or changed characteristics are of interest, such as in certain diagnostic medical imaging i.e. digital fluorography. There are two major subtraction methods in vogue i.e. temporal and energy. Of the two temporal subtraction is by far the more popular in medical applications while energy comparison is used more in land and crop surveillance. In both subtraction methods, the images compared must be aligned.

Temporal subtraction is generally accomplished either by "mask" or "TID" methods. In the "mask" method a selected prior image is subtracted from subsequent images. In the "TID" method, selected ones of a series of prior images are subtracted from selected ones of a series of subsequent images. In both cases it is apparent that the images used for subtraction must be in registration to provide artifact free results.

In digital fluorography e.g., the misregistration problem is especially aggravated by the subject's movement between the "mask" imaging and the subsequent images for example. The imaging sequence in DF normally takes approximately 15 seconds. While the subjects are instructed to hold their breath and not to swallow during this time period; nonetheless, they often do with resultant motion and misregistration.

The presently available re-registration methods; that is, methods which correct for misregistration, most commonly use either edge recognition and comparison or point recognition and comparison. Edges are relatively easy to recognize using differences or derivatives of some sort. However motions parallel to the edges are difficult to discern.

Points are relatively difficult to recognize. The maximum or minimum points are located in regions of small average gradients. Local "noise" also tends to play havoc with the linearity of the system and therefore move the measured point from its actual location to an apparent location. Low pass filters can be used to reduce the noise level but such filters also reduce the derivatives and therefore add an uncertainty to the actual location of the point.

"Global" points, for example, the center of gravity ("COG") of the data in some region of interest ("ROI") depends on the definition of the ROI and therefore have not been sufficiently definitive of the points for use in re-registration. For example, if the data is a step function with the step at a point X0 in the "mask" and at a point X1 in the image; an ROI that includes both points yields a shift in COG of (X1−X0)/2 when the shift of the point is really (X1−X0). To correctly define the shift a larger ROI that includes the opposite step is required. Such a large ROI will encompass complete organs and therefore data that has really changed, e.g. through inflow of contrast material. The correction for misregistration will therefore be incorrect.

Thus, there is presently in the known prior art no accurate and practical method or apparatus for recognizing the amount of the image shift and therefore no reliable protocol method of correcting for the misregistration caused by the image shifts.

Accordingly, it is an object of the present invention to provide means and methods for vectorally determining the image shift between images that are compared and/or subtracted one from the other.

BRIEF DESCRIPTION OF THE INVENTION

According to a broad aspect of the invention a method is provided for determining the object motion that has occurred between first and second radiation acquired images of the said object, said method comprising the steps of:

(a) locating a point on a normally non-changing item, relative to the radiation in each of said images, (b) determining differences in the location of the point in each of said images to obtain a vector value of the motion; and (c) using the vector value to correct for the motion between said first and second images by moving said first and second images relative to each other an amount indicated by said vector value.

More particularly, the method of determining unwanted motion occurring between temporally separated ones of said first and said second images includes the steps of:

(a) subtracting a first of said temporally separated images from a second of said temporally separated images to obtain a subtracted image;

(b) selecting an ROI on the subtracted image that includes a motion artifact, but not a real change;

(c) using the said ROI on said first and second images:

(d) obtaining amplitudes of the gradients in the said ROI on said first and second images;

(e) squaring said amplitudes;

(f) determining the COGs of said squared amplitudes on said first and second images; and (g) determining the value of the vector extending between the COGs of said first and second images, which vector value defines the amount and direction of the movement between the temporally separated images.

A feature of the invention includes combining more than one image to obtain said first or second or both the first and second images.

Another feature of the invention includes the step of reducing the effect of image noise preferably between the steps of squaring the gradient and determining the COGs. This is preferably accomplished by using data cut-off techniques.

A further important feature of the invention includes re-registering said first and second images using the vector value information.

Yet another aspect of the invention includes unique systems for carrying out the above noted inventive methods.

BRIEF DESCRIPTION OF THE DRAWING

The above mentioned and other objects and features of the invention will be better understood upon consideration of the following description of an embodiment of the invention made in conjunction with the accompanying drawing which in block diagram form depicts a system for carrying out the inventive concept.

GENERAL DESCRIPTION

The system 11 of the FIGURE indicates the well known image acquisition portion of the system as acquisition block 12.

It provides the data for the plurality of pixelized images shown at 13 in the form of matrices, such as matrix 14, made up of rows and columns of density data. The rows and columns of the matrices are analogous to imaginary orthagonal x and y coordinates on the image intensifier (not shown) that is part of the acquisition section 12 of the system 11.

Means are provided for subtracting images for enhancement purposes more particularly there is shown readout units 16 and 17 for reading out the image data from the matrices to enable operations to be conducted on the data. The readout unit 16 is shown as coupled to subtraction unit 18 through switch means 19. Similarly, readout unit 17 provides the density data of a matrix or matrices to operator 21. The operator 21 combines certain matrices, in one embodiment, to form "mask" image data in matrix 22.

It should be understood that this invention is not limited to "mask" image subtraction but also includes TID subtraction systems wherein the subtrahend or subtractor is comprised of a multiplicity of images. Rather the range of this invention is sufficiently broad to include subtrahends and/or subtractors comprised of even single images. The scope of the invention further includes image comparison in general, with subtraction being a specific example thereof.

The output of the subtraction unit 18 is the image data in the matrices 23 which results from the subtraction. The digital density data of the matrices 23 are converted to video signals in digital to analog converter 24 for display on CRT unit 26 in any manner well known to those skilled in the art.

The image displayed at unit 26 is normally the difference image of the matrices 23. The displayed image can of course be any of the images 14 if the mask 22 is not transferred to the input of subtraction unit 18. Regardless, the displayed images according to the invention, is used to determine a region of interest (ROI) that has a body part therein that does not change with time. For example a bone doesn't change with time; whereas a blood vessel changes as the injected contrast material flows into the ROI. If the display is of the subtracted image then the ROI can be chosen to focus onto a motion artifact. The ROI chosen is noted in the control unit 27.

The same region of interest is used in determining the amount of misregistration in the temporally separated images due to motion of the subject, as indicated by the ROI selector units 28 and 29.

Means are provided for operating on the images used in the subtraction process to determine the amount of motion caused misregistration. More particularly the switch means 19 can be operated to direct the image, for example matrix 14 of matrix group 13, through ROI selector 29 to the density gradient amplitude determining unit 31, which provides data for storage in density gradient amplitude matrix 14a. The density gradient vector is the derivative of the density of the ROI as a function of the orthogonal coordinates i.e.:

$$\nabla D = (\partial/\partial x; \partial/\partial y)D$$

where D is the density of the body parts as determined by the intensity of the X-rays passing through the body; and x and y are the coordinates both on the image intensifier and of the locations of the density data in the matrices. The squared amplitude of the gradient is therefore:

$$\nabla^2 D = (\partial/\partial x)^2 D + (\partial/\partial y)^2 D$$

Similarly, a switch 32 is operated also under the control of unit 27, to transfer the "mask" data through ROI selector 28 to density gradient amplitude determining unit 33 which provides data that is stored in "mask" density gradient amplitude matrix 22a.

Means, may be but are not necessarily provided in the described embodiment for smoothing the images prior to determining the gradients. More particularly, as shown in the FIGURE filters 34 and 36 are used to smooth the mask image and the image 14 respectively. The filters basically reduce the noise content of the images.

Means are provided for processing the portion of the image being used to determine the amount and direction of the undesired motion of the subject. More particularly, the density amplitude gradients in matrices 14a and 22a are squared by squaring units 37 and 38 respectively. The squared density amplitude gradients are stored in matrices 14b and 22b for the image and mask data, respectively. It should be understood that while individual matrices are shown and described for the density amplitude gradients and the squared density amplitude gradients, the same matrix could be used for both types of data.

The gradient functions are squared in order to assure that gradient values used to determine the COG's are of the same sign throughout the ROI. It would be within the scope of the invention to provide another method of assuring the same such as for example finding the absolute value of the gradient and the term "squaring the gradient values" used herein is defined to include said other methods.

Means are provided for locating a representative point determined by the gradients squared. More particularly COG (centre of gravity) determining units 39 and 41 are provided for operating on the "mask" data in matrix 22b and the image data in matrix 14b. The COGs are of course points and a "line" extending from one of the COGs to the other is a vector value because the COGs are defined points with related coordinate values.

Other noise reducing means such as data cut off (low level thresholding) filters are preferably used. In a prefered embodiment all values of the gradient below some fixed value are set to zero before the COGs as calculated. This method has a number of effects. Firstly it reduces the effect of noise in the images on the result, since the value of the gradients of the noise are low compared to those of the (generally bone) artifacts. Secondly, a value of threshold can be chosen so that the effect of the arterial gradients is also removed, making placement of the ROI easier.

An ROI dimension of about 30×30 pixels for 512×512 images seems to give good results although dimensional values between 20 and 64 have given good results.

Means are provided for determining the vector value relating the two COGs of interest. More particularly subtraction unit 42 determines the x,y vector value relationship between the COGs determined by units 39 and 41.

Means are provided for shifting either the original image or the original mask a vector amount determined by the vector value output of unit 42. More particularly, the output of unit 42 shifts either the original image or the original mask at either the inputs 44 or 46 of subtraction unit 18 responsive to the operation of switch 43, controlled by unit 27.

The resulting image data is in a corrected matrix of the matrices 23. When displayed on unit 26 it will be substantially free of the motion artifact, at least in the region of interest.

Thus a system and method are provided for substantially eliminating the heretofor ubiquitous misregistration problem. The solution is relatively inexpensive, easily accomplished, and effective.

While the above description concerns specific embodiments it should be understood that the embodiments are used by way of explanation and not in any manner by way of limitation on the scope of the invention, which is defined by the accompanying claims.

What is claimed is:

1. A method for correcting for artifacts generated by object motion caused misregistration between different images of the same object, said method comprising of:
   obtaining data for first and second images of the same object, which may have normally changing and normally non-changing portions;
   selecting a point on a normally non-changing portion;
   locating said point in each of said images;
   the step of locating the point including the steps of:
   directing a Region-of-Interest (ROI) to encompass a normally non-changing portion in each of said first and second images;
   determining the density in the ROI in each of said first and second images,
   determining the density gradients in the ROI in each of said first and second images,
   determining the amplitudes of the density gradients in the ROI in each of said first and second images,
   transforming said amplitudes of the density gradients in the ROI in each of said first and second images to quantities that are positive, and
   determining as the point in each of said first and second images the centers of gravity (COGs) of said quantities within the ROI in each of said first and second images,
   subtracting coordinates of the COG of one of said images from coordinates of the COG of the other of said images to provide the vector extending between the point in each of said first and second images, and
   using the vector to move said first and second images relative to each other a distance and direction as determined by said vector.

2. The method of claim 1 wherein said different images are temporally distinguished.

3. The method of claim 1 wherein said different images are energy distinguished.

4. The method of claim 1 wherein the step of directing an ROI includes the steps of:
   (a) comparing said first image to said second image to obtain a third image comprising normally changing portions of the object and motion artifacts,
   (b) locating an ROI on one of the motion artifacts and
   (c) using the same ROI on said first and said second images.

5. The method of claim 1 including the step of smoothing said images.

6. The method of claim 5 wherein smoothing is accomplished by filtering the images to reduce noise.

7. The method of claim 1 wherein said normally changing portions of the object include vascular sections having contrast material entering therein.

8. The method of claim 1 wherein said normally non-changing portion comprises bone.

9. The method of claim 1 wherein said first image comprises a combination of images.

10. The method of claim 1 wherein the step of using the vector value includes using the vector value to re-register said first and second images to minimize artifacts generated by object motion in images obtained by adding said first and second images of the same object.

11. The method of claim 1 wherein the step of using the vector value includes using the vector value to minimize artifacts generated by object motion in images obtained by merging said first and second images of the same object.

12. The method of claim 1 wherein the step of using the vector value includes using the vector value to minimize artifacts generated by object motion in images obtained by subtracting said first and second images.

13. The method of claim 1 wherein one of said different images comprises a combination of images.

14. A system for correcting for artifacts generated by object motion caused misregistration between different images of the same object, said system comprising:
   means for obtaining density data for first and second images of the same object, which may have normally changing and normally non-changing items,
   means for selecting a point on a normally non-changing item,
   means for locating said point in each of said images, said means for locating said point comprising
   means for obtaining density gradients from the density data in a Region of Interest (ROI) similarily placed on both said first and second images
   means for determining the amplitudes of the density gradients from the density gradients in the ROI similarily placed on both said first and second images,
   means for transforming the said amplitudes of the density gradients to quantities that are positive,
   means for determining coordinates of the COGs of said positive quantities within the ROI's, and
   means for subtracting said coordinates to provide the coordinate components of a vector extending between the points defined by the centers of gravity, and
   means for using the vector to move the first and second images relative to each other an amount and direction determined by the vector.

15. The system of claim 14 wherein said second image comprises a combination of images.

16. The system of claim 14 wherein said first and second images are temporally distinguished.

17. The system of claim 14 wherein said first and second images are energy distinguished.

18. The system of claim 14 wherein said means for using the vector value comprises means to minimize the artifacts generated by the object motion when said first and second images are compared.

19. The system of claim 14, wherein the means for locating the points comprise:
means for directing an ROI to encompass a normally non-changing item in each of said images, and
means for determining the location of a point in the ROI in each of said images.

20. The system of claim 19 wherein the means for directing an ROI includes:
means for subtracting said first image from said second image to obtain a subtracted image, said subtracted image comprising normally changing items normally unchanging items and motion artifacts,
means for locating an ROI on one of said motion artifacts, and
means for using the same ROI on said first and second images.

21. The system of claim 14 including means for smoothing said images.

22. The system of claim 21 wherein said smoothing means comprises filter means for filtering out noise.

23. The system of claim 14 wherein said normally changing items include vascular sections having contrast material entering therein.

24. The system of claim 14 wherein said normally non-changing items comprise bone.

25. The system of claim 14 wherein said first image comprises a combination of images.

26. The system of claim 14 wherein said means for using said vector value includes:
means for minimizing artifacts generated by said object motion in images obtained by adding said first and second images.

27. The method of claim 14 wherein the step of transforming the amplitudes to positive quantities includes the step of squaring the amplitudes.

28. The system of claim 14 wherein said means for transforming said amplitudes to positive quantities include means for squaring the amplitudes.

29. The system of claim 14 including means for moving the images relative to each other using the determined vector value.

30. A method of correcting artifacts generated by object motion caused misregistration between first and second images of the same object, said artifacts appearing on a third image made by merging said first and second images, said method comprising the steps of:
obtaining data for first and second images of the same object, which may have normally changing and normally non-changing items;
selecting a point on a normally non-changing item,
locating said point in each of said images;
the step of locating said point on each of said images comprising the steps of:
locating an artifact on the third image,
selecting a portion of the third image which includes the located artifact,
selecting corresponding portions of said first and second images,
obtaining the density of said corresponding portions of said first and second image,
obtaining the gradients of the obtained density,
obtaining the amplitudes of density gradients of the corresponding
portions of the first and second images,
transforming the said amplitudes of the density gradients to quantitites that are all positive, and
and determining the centers of gravity of the positive amplitudes within the corresponding portions,
determining differences between the locations of the COGs in each of said first and second images to obtain a vector of the motion causing the misregistration, and using said vector to correct for the misregistration caused by object motion between the acquisition of said first and second images.

31. The method of claim 30 further comprising a noise reducing step.

32. The method of claim 31 wherein said noise reducing step includes setting relatively low values of the gradient to zero.

33. A system for correcting for artifacts generated by object motion caused misregistration between different images of the same object, said system comprising:
means for obtaining transmittance data for first and second images of the same object, which may have items normally changing in transmittance and items normally non-changing in transmittance, said artifacts appearing on a third image comprised of a merging of said first and second images,
means for selecting a point in a normally non-changing item,
means for locating said point in each of said images,
said means for locating said point in each of said images comprising:
means for selecting a portion of the third images, said portion containing an artifact,
means for obtaining gradients of said transmittance data in portions of said first and second images corresponding to said selected portion of said third image,
means for obtaining amplitude of the gradients of said transmittance data in the corresponding portions of the first and second images,
means for transforming the obtained amplitudes of the gradients to quantities that are all positive,
means for reducing the effect of image noise,
means for determining centers of gravity (COGs) of said positive amplitudes in regions around said normally non-changing items in the corresponding portions in each of said first and second images,
means for determining coordinate differences between the locations of the COGs in each of said images to obtain vector coordinate, of the vector of the motion causing the misregistration, and
means for utilizing the vector for moving said first image relative to the second image the amount of the vector in both amplitude and direction to correct for the misregistration.

34. The system of claim 33 wherein said noise reducing means includes a lower thresholding means.

* * * * *